Feb. 1, 1955 R. KEIRSEY 2,700,957
TILTING TABLE ANIMAL STOCK
Filed Jan. 31, 1951 4 Sheets-Sheet 1

INVENTOR
ROBERT KEIRSEY
BY *Ben Cohen*
ATTORNEY

Feb. 1, 1955

R. KEIRSEY 2,700,957

TILTING TABLE ANIMAL STOCK

Filed Jan. 31, 1951

INVENTOR.
ROBERT KEIRSEY

BY *Ben Cohen*

ATTORNEY

Feb. 1, 1955  R. KEIRSEY  2,700,957
TILTING TABLE ANIMAL STOCK
Filed Jan. 31, 1951  4 Sheets-Sheet 3

INVENTOR
ROBERT KEIRSEY

BY  *Ben Cohn*

ATTORNEY

Feb. 1, 1955    R. KEIRSEY    2,700,957
TILTING TABLE ANIMAL STOCK
Filed Jan. 31, 1951    4 Sheets-Sheet 4
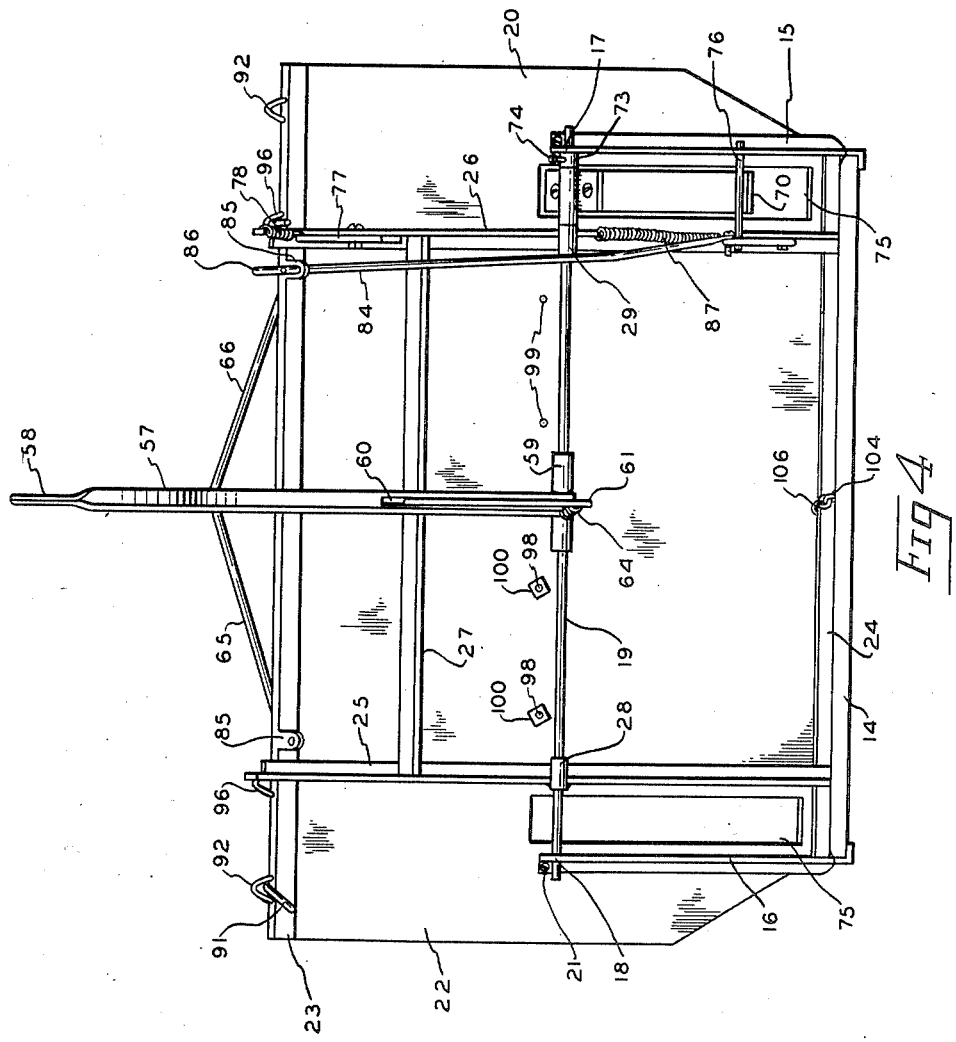
INVENTOR
ROBERT KEIRSEY
BY
ATTORNEY

United States Patent Office 2,700,957
Patented Feb. 1, 1955

2,700,957

TILTING TABLE ANIMAL STOCK

Robert Keirsey, Roy, N. Mex.

Application January 31, 1951, Serial No. 208,712

4 Claims. (Cl. 119—103)

The present invention relates to an improved tilting chute particularly adapted for the handling of livestock, such as calves and constitutes an improvement over my prior Patents Nos. 2,446,769, patented August 10, 1948, and 2,483,909, patented October 4, 1949.

The tilting chute has become increasingly popular in recent years because of its ability to perform the various operations customarily performed upon livestock, such as branding, inoculating, castrating, de-horning and the like, with less danger of infection to the livestock, with increased efficiency, and with reduced costs.

The simplest and most practical form of tilting chute now in use is shown in my prior patents mentioned above and also shown in the patent to A. B. Staggs, No. 2,477,213, patented July 26, 1949. The chute disclosed in these patents consists essentially of a supporting base, a swingable table mounted thereon, a clamp member spaced from but pivotally mounted adjacent the lower edge of the swingable table, means for moving said clamp towards the table for securely clamping the animal against the table, and means for tilting the table from a vertical position to a horizontal position in order to perform the customary operations upon the animal while clamped in this horizontal position. The prior patented devices also show various mechanical expedients for supporting the table in horizontal position, for additionally clamping the head of the animal and for holding the legs of the animal in proper position.

The primary object of the present invention is to improve the constructions disclosed in these prior patents by simplifying the relatively complicated prior art devices thereby resulting in a less expensive chute, and also improving the general efficiency of the tilting chute.

A specific object of the present invention is to provide an improved construction for supporting the tilting table in a horizontal position which is simpler and more efficient than any heretofore constructed.

A further feature of the present invention resides in the novel arrangement of parts whereby the apparatus can be readily changed to brand the animal on either the right or left side.

A further important object of the present invention is to provide a novel arrangement at the rear portion of the chute to insure proper entry of the animal into the chute and to prevent the animal from backing out of the chute upon completion of the branding and other operations.

A still further feature of the present invention is in the provision of a novel arrangement at the forward end of the chute which serves as a gate blind to properly position the head of the animal to be grasped by the neck gate and to prevent the animal from jumping over said gate.

Still another feature of the present invention is the provision of an improved leg spreader which is simple in the construction and easy to operate.

Other and further specific objects, features and advantages of the present invention will be apparent from the following description, read in connection with the accompanying drawings, in which Figure 1 is a perspective view of the tilting chute forming the subject matter of the present invention.

Figure 4 is a rear view of the tilting chute.

Figure 5 is a perspective view of a small section of the chute showing the manner of supporting the leg spreader in operative position.

Figure 2:
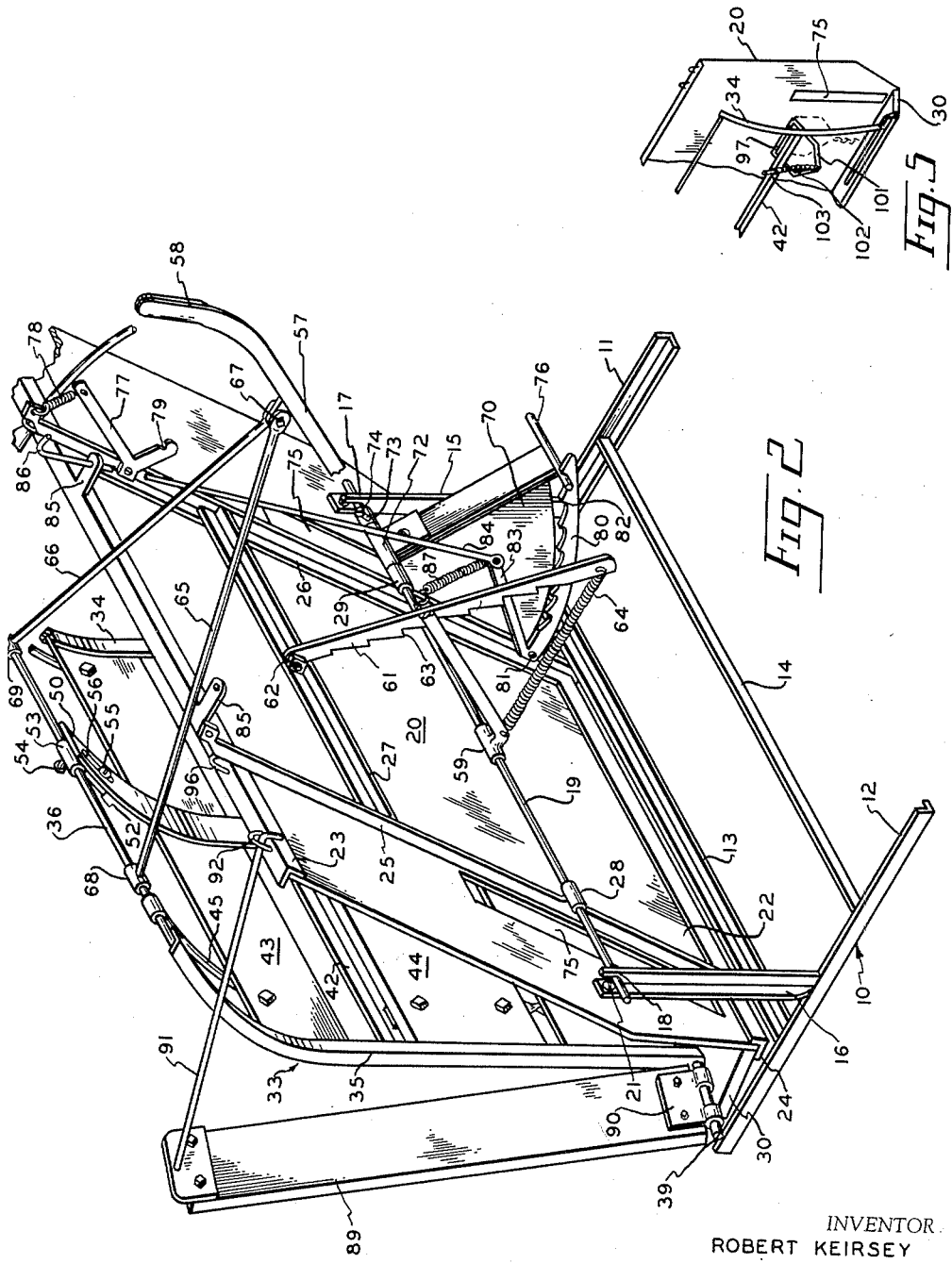
Figure 2 is a perspective view of the reverse side of the tilting chute shown in Figure 1.

Referring to the drawings in detail wherein like reference numerals designate like parts throughout the several views, a base member 10 forms a supporting frame for the tilting chute and comprises a pair of parallel angle irons 11 and 12 connected by a pair of cross members 13 and 14. Supported centrally of the angle irons 11 and 12 are vertical support members 15 and 16 rigidly secured to the angle irons. The upper ends of the support members 15 and 16 are shaped to form U-shaped sockets 17 and 18 to receive the opposite ends of a shaft 19 upon which the tilting table 20 is mounted for rotation. The shaft or axle 19 is of such thickness and strength as to substantially support the weight of the table 20 and the calf to be operated upon thereby substantially eliminating the need for any additional supporting means. The shaft is held against separation in the sockets by means of a retractable bolt 21 as seen in Figures 2 and 3 whereby the shaft can be readily removed from the base either for reversing the tilting table as will be explained in detail below or for separation of the parts for easy transport of the device.

The tilting table 20 may be of any suitable shape but as shown in the drawings, comprises a flat sheet of metal 22 reinforced at its upper and lower edges with angle irons 23 and 24. Vertical reinforcing members 25 and 26 formed of angle irons are welded to the upper and lower angle irons 23 and 24 as seen in Figs. 2 and 3. A transverse angle iron 27 is welded to the vertical members 25 and 26 for further reinforcement. The vertical reinforcing members 25 and 26 are provided with integral bearing hubs 28 and 29 adapted to receive the shaft 19 for tiltably mounting the table 20. The hubs 28 and 29 are positioned substantially midway of the reinforcing members whereby the table is properly balanced so that very slight pressure is required to tilt the table.

Figure 3:
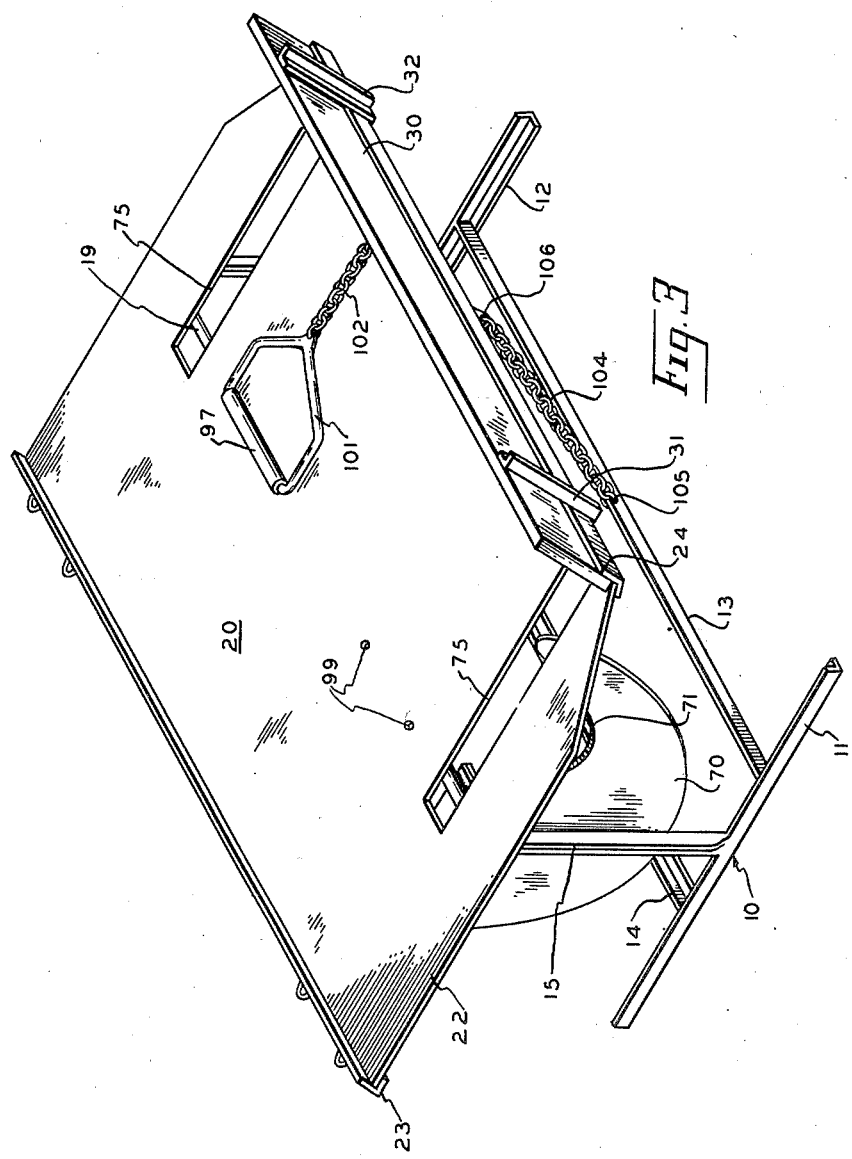
Figure 3 is a perspective view of the table in tilted position.

As seen in Figure 3, an animal supporting platform 30 is rigidly secured to the lower end of the table 20 and extends at right angles thereto. The platform 30 is supported on a flange of the angle iron 24 and brackets 31 and 32 rigidly secured to the lower ends of the vertical reinforcing members 25 and 26 and at right angles thereto.

The squeeze side or clamping member of the chute is broadly indicated by numeral 33 and comprises a generally rectangular frame member formed of a pair of vertically extending curved angle irons 34 and 35, connected at their upper ends by a horizontal rod 36 and at their lower ends by a horizontal rod 37. The outer ends of rod 37 extend beyond the vertical members, as seen at 38 and 39, and are slightly bent away from the chute for a purpose to be described. The platform 30 is provided with a pair of hubs 40, 41 for receiving the rod 37 to permit pivotal movement of the squeeze side 33.

Figure 1:
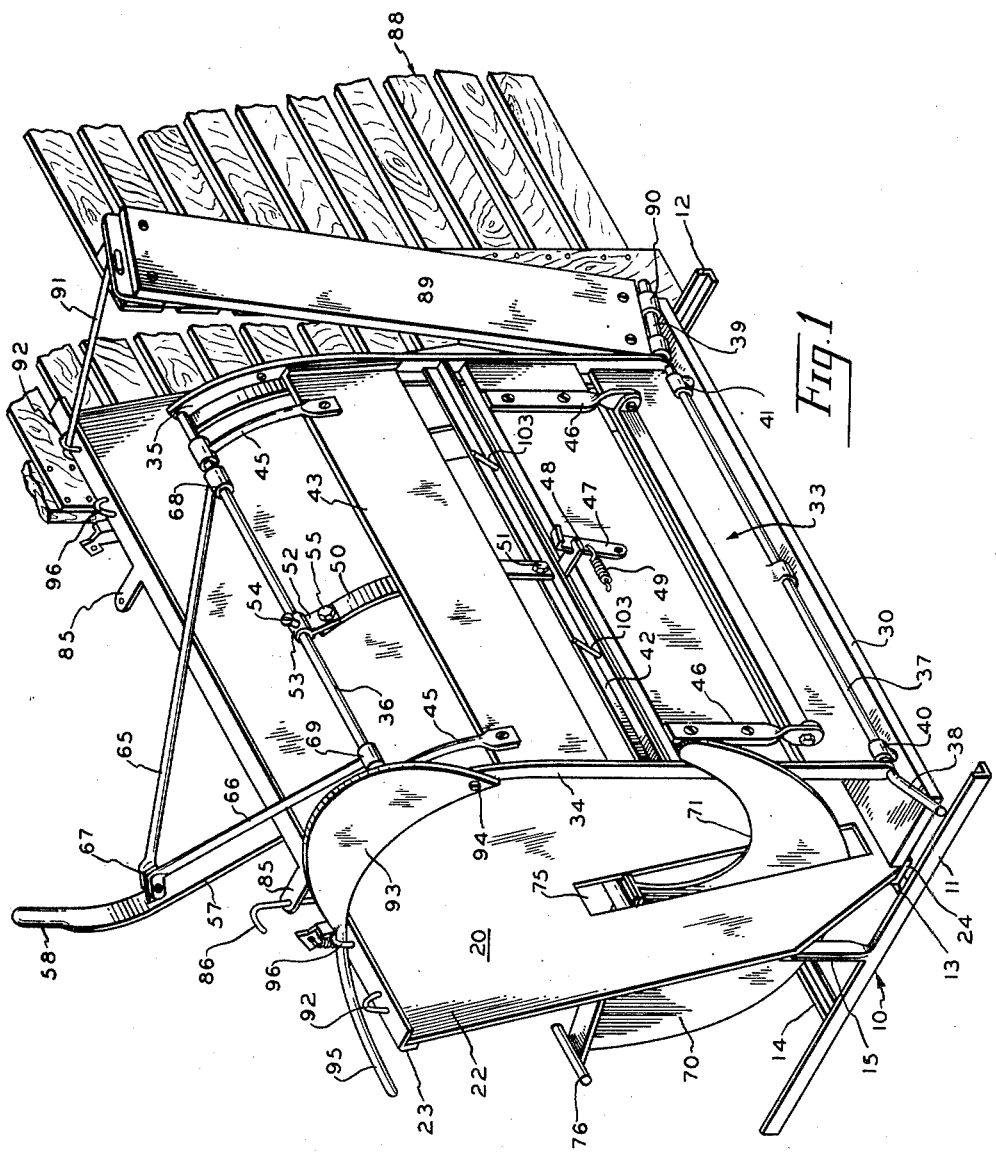

As seen in Figure 1, a cross bar 42 in the form of a reinforcing angle iron extends between the two vertical curved members 34 and 35. Panel portions 43 and 44 are provided on the frame member to complete the squeeze side 33. The panel 43 is pivotally supported on rod 36 by means of brackets 45 and is held closed by its own weight. The lower panel 44 is pivoted to the lower portion of the frame member by hinge brackets 46 and held in closed position by the pivoted latch member 47 cooperating with the keeper 48. A spring 49 holds the latch member in latched position.

Referring to Figures 1 and 2, the frame forming the squeeze side is further provided with a curved metal strap 50 disposed centrally of the upper half of the frame. The lower end of the strap is pivoted to cross bar 42 by pivot pin 51 and is slidably connected to the rod 36 by means of a bracket member 52. The bracket member 52 comprises a collar 53 slidable on the rod 37 and locked in position by set screw 54. The lower end of the bracket 52 is pivoted to the metal strap 50 by means of a bolt 55 extending through slot 56. As a result of this construction the upper end of strap 50 can be moved to the left or right of its normal position as shown so that the strap will not interfere with any operations to be performed on the animal in the chute.

The squeeze side 33 is adapted to be moved towards the table by means of the following mechanism: A bar 57, having its upper end shaped to form a handle portion 58, is pivotally connected at its lower end to shaft 19 through a collar hub 59. The bar 57 is slotted at 60 to receive a rack bar 61, one end of which is pivoted to transverse angle iron 27 at 62. The rack teeth 63 cooperate with the lower wall forming the slot 60 to lock the bar in various positions. A coiled spring 64 connects the outer end of rack bar 61 to the lower end of bar 57 to hold the rack bar in locked position. The rack bar may be released from locked position by raising the outer end of the rack bar against the action of the spring. Adjacent the handle portion of bar 57, a pair of divergent rods 65, 66 are pivoted to bar 57 at 67 and at their opposite ends are pivoted to rod 36 at 68 and 69.

A rotatable neck gate is provided at the forward end of the chute for firmly holding the neck of the animal against the table. The neck gate comprises a flat plate 70 having a cutout portion 71 to receive the neck of the animal. The plate 70 is provided with a bearing collar 72 adapted to be mounted on shaft 19 for pivotal movement thereabout. A removable collar 73, carrying a set screw 74, serves to hold the neck gate in position on the shaft. The table 20 is provided with suitable slots 75 to permit passage of the neck gate therethrough. The provision of two slots permits interchangeable positioning on either end of the tilting table as will be more fully described hereinafter.

Suitable means are provided for latching the neck gate in inoperative position and also in several operative positions to accommodate animals of different sizes. One end of the neck gate 70 is provided with a transverse bar 76 cooperating with a pivoted latch bar 77 mounted at the upper rear end of the tilting table 20 and held in operative position by a spring 78 secured to the latch bar and the table. A notch 79 is formed in the latch bar 77 to receive the transverse bar 76. Below the latch bar 77, adjacent the lower side of the tilting table, a curved rack member 80 is pivotally secured to the table at point 81. The rack bar is provided with a plurality of teeth 82 for receiving the transverse bar 76 in various adjusted positions. Angularly disposed with relation to the rack bar and rigidly formed therewith is an operating lever 83 having its free end pivotally connected to a vertically disposed operating rod 84, the upper portion of which slides in an apertured bracket 85, extending rearwardly from the upper edge of the tilting table. The upper end of the operating rod 84 is bent to form a handle portion 86 for suitable grasping by an operator. A spring 87 is connected between the operating lever and the tilting table to hold the rack member 80 in proper latched position.

Referring to Figure 1, numeral 88 generally indicates a conventional panel chute through which the calves are led into the tilting chute. From the foregoing description of the tilting chute, it will be apparent that the squeeze side of the chute is of less width than the width of the tilting table. This results in a gap between the squeeze side of the tilting chute and the panel chute and would allow the calf to go out through this gap instead of going into the chute. A tailboard, indicated by numeral 89, is used to close this gap. A hinge bracket 90 is mounted at the lower end of the tailboard for hingedly mounting the tailboard on either of the bent portions 38 or 39 of rod 37. Since the bent portions are at an angle away from the table, the tailboard forms a funnel with the chute, thus making it easier to get the calf to enter the chute.

A connecting bar 91, having one end pivotally connected to the upper edge of the tailboard, extends through a guide bracket 92 at the upper side of the tilting table. This arrangement permits the tailboard to swing towards the tilting table but limits outward movement of the tailboard. The length of the connecting bar 91 is approximately equal to the full opening of the panel gate. When the chute is pulled over so that the calf is on its side, the connecting bar 91 slides through its guide bracket 92. When the chute is uprighted, the tailboard remains in a closed position, thus closing the rear end of the chute so the calf cannot back out, but must go out the front end of the chute.

At the forward end of the chute, means are provided to prevent the calf from jumping over the neck gate and to insure proper positioning of the calf's head to be grasped by the neck gate. The means comprises a gate blind or guide member formed of an arcuate shaped sheet of metal 93, having one end pivoted at 94 to the squeeze side 34 and having an extension 95 extending through a guide bracket 96 on the tilting table.

In my previous patents mentioned above, I have shown a novel leg spreader adapted to separate the animal's rear legs and hold them fixedly in separated position without further holding on the part of the operator. An important feature of the present invention is the provision of an improved leg spreader. The spreader comprises a pipe section 97 upon which are welded a pair of threaded bolts 98, adapted to extend through a pair of openings 99 in the tilting table and fastened in position by nuts 100. A hoop member 101 has its end received in the pipe section 97 to permit the hoop to hinge about the pipe section. A short length of chain 102 is welded to the hoop member and is adapted to be hooked over a pin 103 carried by angle iron 42 as schematically shown in Figure 5. When the squeeze side is operated and the table tilted to bring the calf on its side, the spreader is simply pulled up between the calf's hind legs and fastened by the chain 102 over the pin 103 to hold the loop in place.

The tilting chute described above has been constructed and designed to enable ready tilting of the chute when the calf is clamped in the chute. The construction is such that very little effort is necessary on the part of the operator to lift the calf over on its side and is primarily due to the manner of supporting the tilting table. The particular manner of supporting the table makes it possible to eliminate any complicated structure to hold the table in horizontal position. As seen in Figure 3, a chain 104 is connected to cross member 13, midway thereof at point 105 and midway of tilting table 20 at point 106. The chain 104 limits the tilting movement of the table and the table is so balanced that the weight of the calf tilts the table slightly beyond the horizontal with respect to the holding chain.

From the above description, the method of the operation and the use of the device should now be readily understandable. When it is desired to operate on a calf or other animal, the same is led down the panel chute 88 and driven between the table 20 and the squeeze side 33 until its head passes beyond the slot 75 nearest the neck gate 70, whereupon the neck gate 70 is swung about the shaft 19 until the animal's neck is held firmly against the table 20. The gate blind 93 insures proper positioning of the animal's neck to be grasped by the neck gate. The neck gate is latched in position by engagement of the bar 76 with one of the rack teeth 82. The neck gate is released from latching position by merely pushing down on handle portion 86. The operator, standing at the rear of the chute then pulls the handle member 58 towards him which causes the squeeze side 33 to pivot in hubs 40 and 41 towards the table 20 until the animal is firmly clamped and continued pulling of the handle tilts the table into substantially horizontal position. The chain 104 limits the tilting until the table passes the horizontal a very slight distance. The rack bar 61 cooperates with bar 57 to lock the squeeze side in clamped position.

Thus, it will be seen that the animal is firmly held against movement in any direction. The head of the calf is in convenient position for de-horning or the like and the branding operation may be accomplished by raising the panel portion 43. To firmly hold the hind legs of the calf in position during the castration operation, lower panel 44 is opened whereupon the leg spreader is lifted between the hind legs of the calf until it bears against angle iron 42 and held in this position by hooking chain 102 over pin 103. The calf or animal is released by reversing the steps set forth above.

The device may be utilized for operation on either the right or left-hand side of the animal by merely changing the position of the neck gate, the leg spreader, the tail gate, the gate blind and the neck gate ratchet to the opposite end of the chute from the position shown. It will be noted that each half of the tilting table about a vertical center line is a duplicate of the other half in order to permit reversal of the above parts.

Having thus described the invention, what is claimed is:
1. In a stock handling device, a base frame, spaced vertical supports mounted thereon, a table pivotally mounted intermediate its width on said supports for tilt- ing movement about a horizontal axis, an animal supporting platform secured adjacent one edge of said table and extending laterally therefrom in a plane substantially normal to the plane of the table, a clamping member spaced from said table and pivotally mounted to the supporting platform and swingable to and away from said table, stop means operatively connected to said base frame and to said table to limit the tilting of the table, and handling means operatively connected to said clamping member and to said table for successively swinging said clamping member toward the table for securing an animal and for tilting the table.

2. In a device of the character described in claim 1, said stop means comprising a flexible chain.

3. A device of the character described in claim 1, a neck gate pivotally connected to the table for clamping an animal's head against the table, and a guide member positioned above the neck gate for directing the head of the animal into position to be clamped by said neck gate.

4. A device of the character described in claim 1, a leg spreader pivotally connected to the table for movement between the legs of an animal clamped to the table for spreading the rear legs of said animal, and means on said leg spreader for attachment to the clamping member to hold the leg spreader in operative position.

References Cited in the file of this patent

UNITED STATES PATENTS

| | | |
|---|---|---|
| 847,180 | Housam | Mar. 12, 1907 |
| 2,446,769 | Keirsey | Aug. 10, 1948 |
| 2,458,582 | Flohr | Jan. 11, 1949 |
| 2,477,213 | Staggs | July 26, 1949 |
| 2,483,909 | Keirsey | Oct. 4, 1949 |
| 2,518,146 | Johnson et al. | Aug. 8, 1950 |
| 2,520,585 | Walker et al. | Aug. 29, 1950 |
| 2,528,664 | Niece | Nov. 7, 1950 |